US011719267B2

(12) United States Patent
Oh et al.

(10) Patent No.: US 11,719,267 B2
(45) Date of Patent: Aug. 8, 2023

(54) DEVICE AND METHOD FOR MOUNTING LEAP BLOCK

(71) Applicant: HUVITZ CO., LTD., Anyang-si (KR)

(72) Inventors: Dong Kun Oh, Anyang-si (KR); Jin Ho Kim, Anyang-si (KR); Beom Mo Kim, Anyang-si (KR)

(73) Assignee: HUVITZ CO., LTD., Anyang-si (KR)

( * ) Notice: Subject to any disclaimer, the term of this patent is extended or adjusted under 35 U.S.C. 154(b) by 0 days.

(21) Appl. No.: 17/863,906

(22) Filed: Jul. 13, 2022

(65) Prior Publication Data

US 2023/0031187 A1 Feb. 2, 2023

(30) Foreign Application Priority Data

Jul. 27, 2021 (KR) .................. 10-2021-0098672

(51) Int. Cl.
*F16B 1/00* (2006.01)
*G02C 13/00* (2006.01)

(52) U.S. Cl.
CPC ........ *F16B 1/00* (2013.01); *F16B 2001/0035* (2013.01); *G02C 13/001* (2013.01)

(58) Field of Classification Search
CPC .......................... F16B 1/00; F16B 2001/0035
See application file for complete search history.

(56) References Cited

U.S. PATENT DOCUMENTS

| 4,479,332 A | 10/1984 | Stern et al. |
| 6,763,600 B2 | 7/2004 | Feldman |
| 7,884,928 B2 | 2/2011 | Mizuno et al. |
| 2006/0286902 A1 | 12/2006 | Covarrubias et al. |
| 2016/0363142 A1* | 12/2016 | Yeung ................... F16B 7/0426 |

FOREIGN PATENT DOCUMENTS

| EP | 1839810 A1 | 10/2007 | |
| EP | 1842622 A1 * | 10/2007 | ......... B24B 13/0055 |
| JP | 05-023962 A | 2/1993 | |
| KR | 10-2004-0049049 A | 6/2004 | |
| KR | 10-2021-0133863 A | 11/2021 | |

OTHER PUBLICATIONS

European search report for corresponding EP Application No. 22186621.3 dated Nov. 15, 2022.
Office action for corresponding KR Application No. 10-2021-0098672 dated Mar. 20, 2023.

* cited by examiner

*Primary Examiner* — Jason L Vaughan
*Assistant Examiner* — Amanda Kreiling
(74) *Attorney, Agent, or Firm* — United One Law Group LLC; Kongsik Kim; Jhongwoo Peck

(57) ABSTRACT

A device for mounting a leap block capable of automatically adjusting the mounting direction of the leap block comprises a block stand fixedly mounted to one end of a blocking device frame and configured to support a leap block so that the leap block is rotatable in a horizontal direction; the leap block in which a support rotatably supported by the block stand is formed in the center, and a first magnetic body is mounted in one direction; and a leap block mounting unit to which a second magnetic body that couples with the first magnetic body by magnetic force is mounted in one direction, and which rotates in the horizontal direction and couples with the leap block in a fixed direction.

6 Claims, 4 Drawing Sheets

(A)          (B)

DEVICE AND METHOD FOR MOUNTING LEAP BLOCK

CROSS-REFERENCE TO RELATED APPLICATION

This application claims benefit from Korean Application No. 10-2021-0098672 filed on Jul. 27, 2021, which application is incorporated herein by reference in its entirety.

TECHNICAL FIELD

The present disclosure relates to a device and method for mounting a leap block, and more particularly, to a device and method for mounting a leap block capable of automatically adjusting the mounting direction of the leap block.

RELATED ART

Eyeglasses are made by fitting lenses for correcting vision into an eyeglass frame selected by a consumer. In order to make eyeglasses, it is necessary to machine the outer shape of lenses sold in a round shape, i.e., blank lenses so as to conform to an eyeglass frame, and to this end, such devices as a tracer, a blocker, a lens machining tool, and so on are used. The tracer is a device for reading the shape of an eyeglass frame, and the lens machining tool is a device for machining blank lenses into the shape of the eyeglass frame. The blocker is a device for attaching a leap block (or connecting block), which serves as a lens fixing device, to a machining reference point of a blank lens in order to mount the blank lens onto the lens machining tool (See U.S. Pat. No. 7,884,928). Once the leap block is attached to the blank lens, the blank lens is mounted to a clamp of the lens machining tool via the leap block, and the blank lens is machined into the shape of the eyeglass frame.

Since blank lenses have their refractive powers, astigmatic axes, machining center points, etc., depending on the visual acuity conditions of eyeglass wearers, it is necessary to control the direction in which the leap block is attached when attaching the leap block to a blank lens. Therefore, when mounting the leap block to the blocker too, it is necessary to adjust the mounting direction of the leap block. FIG. 1 is a photograph showing the process of mounting a leap block to a common blocker. As shown in FIG. 1, a marker unit 14 indicating the mounting direction of the leap block 5 is attached in the vicinity of the leap block mounting unit 12 of the common blocker frame 10. A user positions the leap block 5 in the same direction as the indication of the marker unit 14 (see A of FIG. 1), and in that state, moves the leap block 5 to below the leap block mounting unit 12 having a predetermined tooth form formed at the bottom thereof, and then, fits the leap block 5 upward from below into the leap block mounting unit 12, thereby fixing it to conform to the tooth form of the leap block mounting unit 12 (see B of FIG. 1). However, in the method above, it is inconvenient for the user to work with since the mounting space of the leap block 5 is narrow, as well as a mistake of mounting the leap block 5 with the axis of the leap block 5 deviated by 180 degrees (i.e., in reverse) tends to occur as the user must adjust the mounting direction of the leap block 5 himself or herself. Further, since the leap block 5 is mounted by using the hands in the direction from below to above, there are also problems that the adhesive portion (tape) at the lower part of the leap block 5 adheres to the hands and makes it hard to work with, or the adhesive portion is contaminated by the hands of the user, resulting in the deterioration of the adhesive strength of the adhesive portion.

As another method of mounting the leap block 5 to the leap block mounting unit 12, there is a case where a stand into which the leap block 5 is fitted only in a certain direction is used. This method is of such a structure in which when a user correctly positions the leap block 5 under the leap block mounting unit 12 by aligning the direction, the leap block mounting unit 12 is lowered, and the leap block 5 is fixed so as to be fitted into the tooth form formed at the lower part of the leap block mounting unit 12. However, in this case, there exist the inconveniences that in order for the leap block 5 to be fitted into the stand only in a certain direction, not only do the leap block 5 and the stand need to be custom-made, but also does the user have to intentionally adjust the mounting direction of the leap block 5 when placing the leap block 5 on the stand.

PRIOR ART LITERATURE (Patent Document 1) U.S. Pat. No. 7,884,928
(Patent Document 2) Korean Patent Application No. 10-2021-0015665

SUMMARY

Technical Objects

It is an object of the present disclosure to provide a device and method for mounting a leap block capable of automatically adjusting the mounting direction of the leap block.

It is another object of the present disclosure to provide a device and method for mounting a leap block that allows the leap block to be mounted in a correct direction even if a user does not take the mounting direction of the leap block into account.

Technical Solution

In order to achieve the above objects, the present disclosure provides a leap block mounting device comprising: a block stand 70 fixedly mounted to one end of a blocking device frame 10 and configured to support a leap block 5 so that the leap block 5 is rotatable in a horizontal direction; the leap block 5 in which a support portion 82 rotatably supported by the block stand 70 is formed in the center, and a first magnetic body 84 is mounted in one direction; and a leap block mounting unit 30 to which a second magnetic body 38 that couples with the first magnetic body 84 by magnetic force is mounted in one direction, and which rotates in the horizontal direction and couples with the leap block 5 in a fixed direction.

In addition, the present disclosure provides a leap block mounting method, comprising the steps of: supporting a leap block 5 so as to be rotatable in the horizontal direction on a block stand 70 fixedly mounted to one end of a blocking device frame 10, wherein a support portion 82 rotatably supported by the block stand 70 is formed in the center of the leap block 5, and a first magnetic body 84 is mounted in one direction; and causing the leap block 5 to be aligned and coupled to a leap block mounting unit 30 in a fixed direction, by bringing the leap block mounting unit 30 on which a second magnetic body 38 to be coupled with the first magnetic body 84 by magnetic force is mounted in one direction close to the leap block 5 and rotating the leap block mounting unit 30 in the horizontal direction.

Effects of the Disclosure

According to the device and method for mounting a leap block in accordance with the present disclosure, the mounting direction of the leap block is automatically adjusted, and thus, the leap block can be mounted in the correct direction even if a user does not take the mounting direction of the leap block into account.

DETAILED DESCRIPTION

Hereinafter, the present disclosure will be described in detail with reference to the accompanying drawings. In the present specification, a downward direction indicates a direction in which a blank lens is located, i.e., a direction in which a leap block is attached to a blank lens, an upward direction indicates a direction in which the leap block is located, and left and right directions indicate the left direction and the right direction, respectively, on the basis of the drawings.

Figure 1:
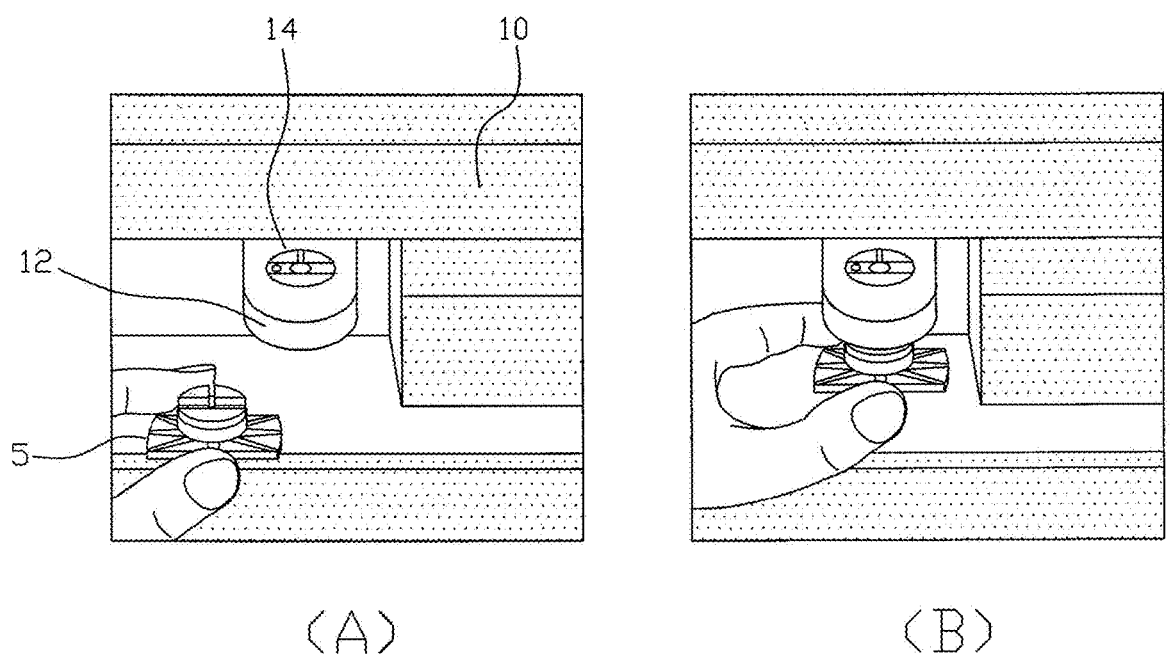
FIG. 1 is a photograph showing the process of mounting a leap block to a common blocker.
Figure 2:
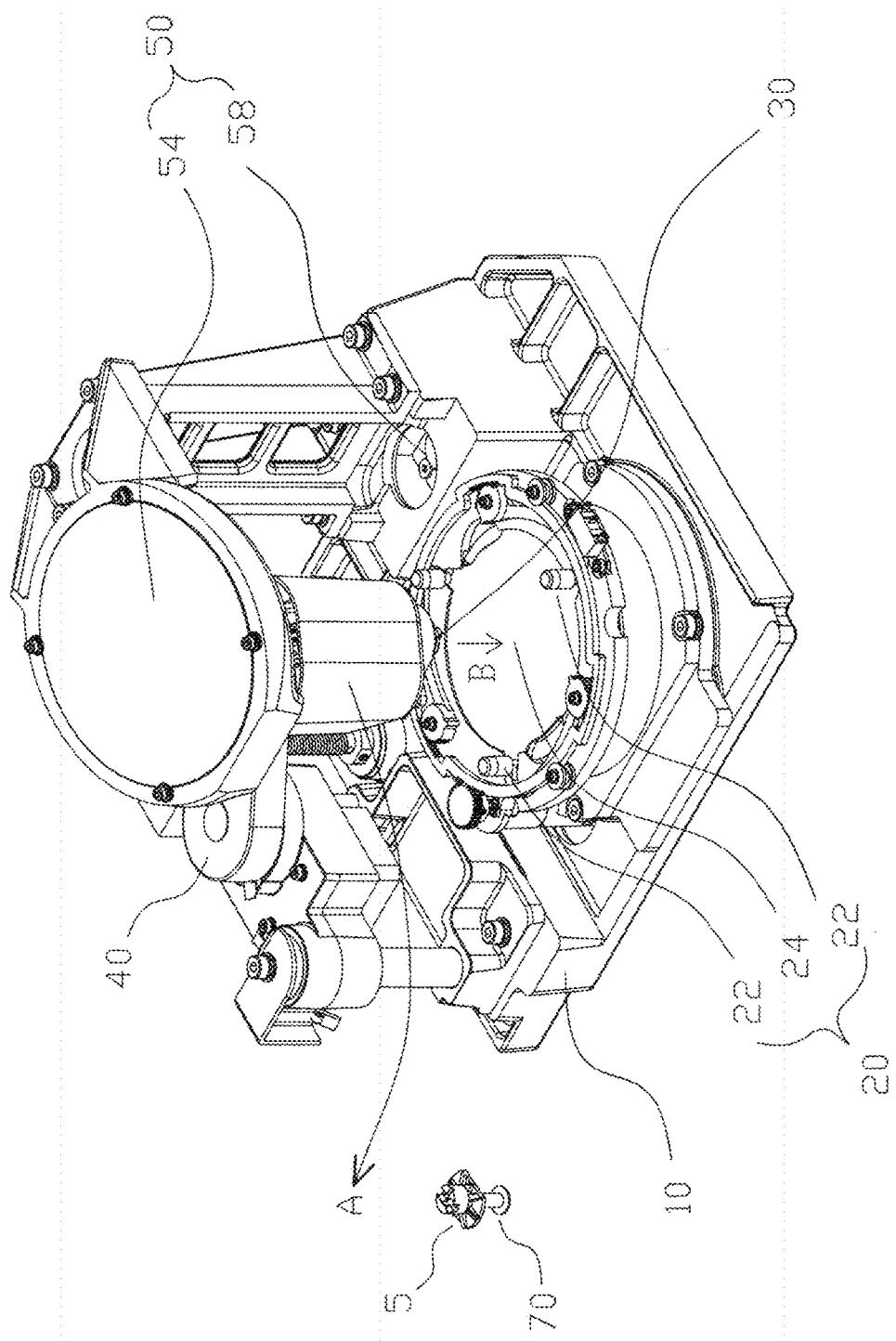
FIG. 2 is a perspective view showing an internal structure of a blocking device including a leap block mounting device in accordance with one embodiment of the present disclosure.

FIG. 2 is a perspective view showing an internal structure of a blocking device including a leap block mounting device in accordance with one embodiment of the present disclosure. As shown in FIG. 2, the blocking device in which the leap block mounting device in accordance with the present disclosure can be used includes a blank lens support unit 20, a leap block mounting unit 30, a blocking arm 40, and a lens image detection unit 50.

The blank lens support unit 20 is a device for positioning a blank lens (not shown) to be attached to a leap block 5, and includes one or more, for example, three lens supports 22, arranged on the circumference at 120-degree intervals, as shown in FIG. 2, that support the rear edge of the blank lens. The lens supports 22 may change their positions, such as moving closer to each other toward the center or moving away from each other, depending on the size of the blank lens they support. The user appropriately adjusts the positions of the lens supports 22 according to the size of the blank lens, and then positions the blank lens on top of the lens supports 22 so that the lens supports 22 stably support the edge of the blank lens. In addition, the blank lens support unit 20 may further include a common reflector 24, located on the rear surface of the lens supports 22, for detecting the shape of the blank lens.

The leap block mounting unit 30 is a device onto which the leap block 5, which is to be mounted on the blank lens, is detachably mounted, and the leap block 5 is mounted to the lower end of the leap block mounting unit 30 by a method such as, for example, fitting or magnetic coupling. The blocking arm 40 is a device for driving the leap block mounting unit 30 and attaching the leap block 5 to the blank lens. Specifically, in the state in which the blocking arm 40 has moved the leap block mounting unit 30 outward (e.g., in the direction of arrow A in FIG. 2), the leap block 5 located on the block stand 70 is mounted to the lower end of the leap block mounting unit 30. After that, the blocking arm 40 moves the leap block mounting unit 30 to a desired position above the blank lens, and lowers the leap block mounting unit 30 (in the direction of arrow B in FIG. 2), allowing the leap block 5 to be attached to the blank lens. Once the leap block 5 is attached to the blank lens, the blocking arm 40 raises and returns the leap block mounting unit 30 from which the leap block 5 has been detached to the initial position. In FIG. 2, the lens image detection unit 50 is a device for detecting the shape of the blank lens located in the blank lens support unit 20, and may include a focusing mirror 54 for focusing and reflecting the image of the blank lens and an image element 58 for detecting the reflected light reflected by the focusing mirror 54.

Figure 3:
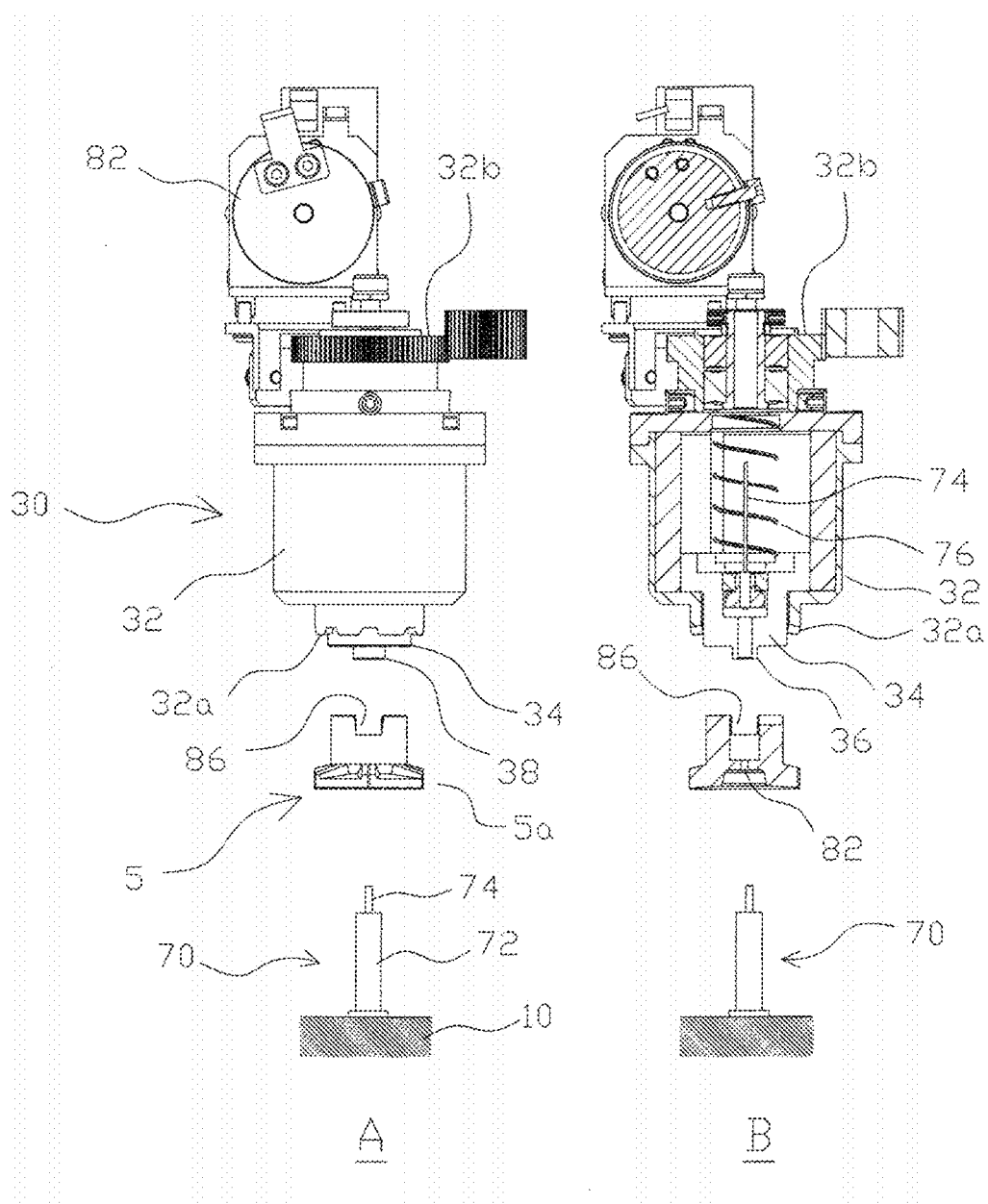
FIG. 3 is a view showing an external structure (A) and an internal structure (B) of a leap block mounting device in accordance with one embodiment of the present disclosure.
Figure 4:
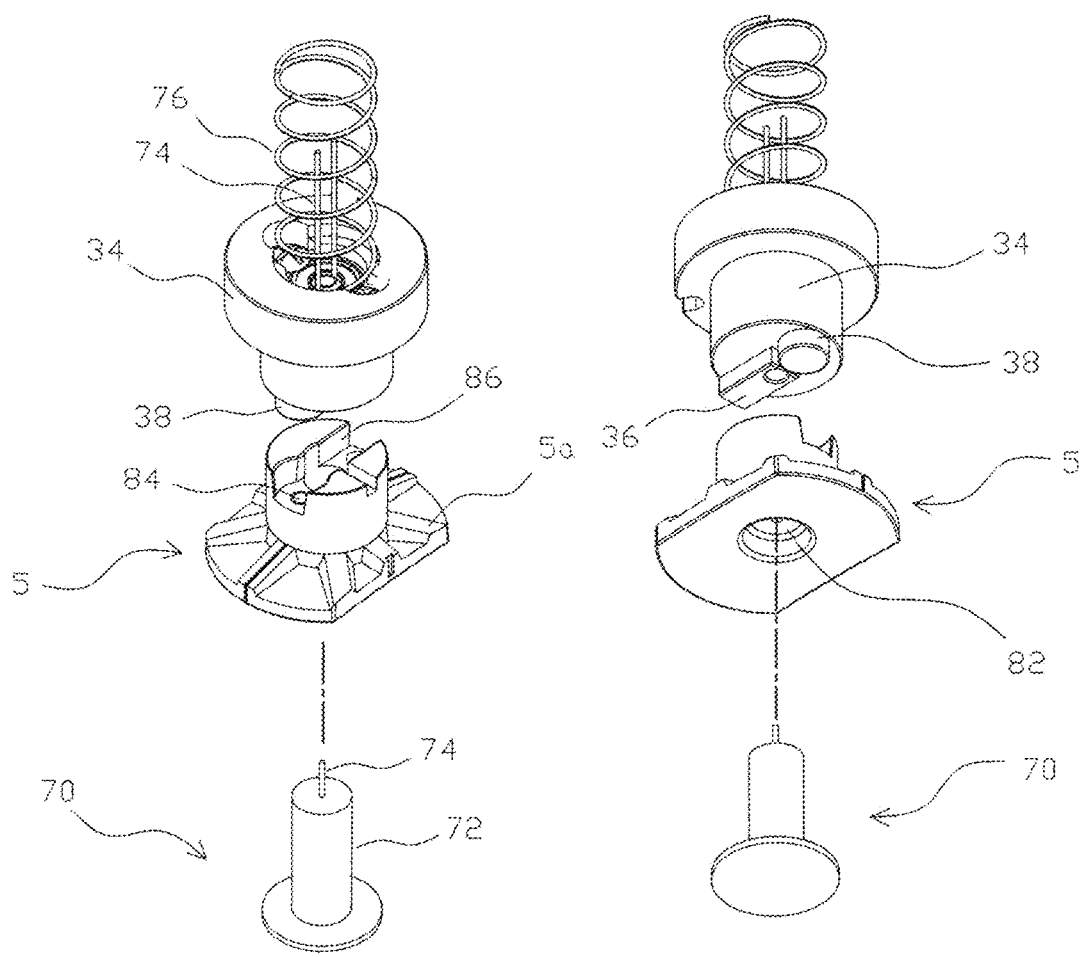
FIG. 4 is top and bottom perspective views for illustrating a process in which a leap block 5 is mounted to a leap block fixing unit 34 in a leap block mounting device in accordance with one embodiment of the present disclosure.

FIG. 3 is a view showing an external structure (A) and an internal structure (B) of a leap block mounting device in accordance with one embodiment of the present disclosure, and FIG. 4 is a view for illustrating a process in which a leap block 5 is mounted to a leap block fixing unit 34 in a leap block mounting device in accordance with one embodiment of the present disclosure. As shown in FIG. 3, the leap block mounting device in accordance with the present disclosure includes a block stand 70, a leap block 5, and a leap block mounting unit 30.

The block stand 70 is fixedly mounted to one end of a blocking device frame 10 (see FIGS. 2 and 3), and supports the leap block 5 so that the leap block 5 is rotatable in the horizontal direction. According to one embodiment of the present disclosure, the block stand 70 includes a stand body 72 having one end fixed to the blocking device frame 10 and supporting the leap block 5, and a block fixing portion 74 fixed to the other end of the stand body 72 and having one end rotatably supporting the leap block 5. As shown in FIGS. 3 and 4, the block stand body 72 may have a cylindrical shape, and the block fixing portion 74 may have a cylindrical shape having a diameter smaller than that of the block stand body 72.

The leap block 5 is intended to be attached to the blank lens in a predetermined direction, in which a support portion 82 rotatably supported by the block stand 70 is formed in the center, and a first magnetic body 84 is mounted in one direction. The support portion 82 can have a variety of structures that can be rotatably supported by the block stand 70. For example, as shown in FIGS. 3 and 4, if the block fixing portion 74 of the block stand 70 has a cylindrical shape, the support portion 82 may have a structure in which a hole having a diameter larger than that of the block fixing portion 74 and smaller than that of the stand body 72 is formed. For example, the diameter $\emptyset$ of the hole formed in the support portion 82 may be 1.1 mm, and the diameter of the block fixing portion 74 may be 1 mm. With such a structure, the block fixing portion 74 of the block stand 70 may be inserted into the hole formed in the support portion 82 and supported rotatably. As another example, the block fixing portion 74 may have a conical structure and the support portion 82 may have a funnel structure in which the block fixing portion 74 of the conical structure is inserted and rotated, or conversely, the support portion 82 may have a conical structure and the block fixing portion 74 may have a funnel structure in which the support portion 82 is inserted and rotated. The first magnetic body 84 is mounted in one direction with respect to the leap block 5. Here, the fact that the first magnetic body 84 is mounted in one direction means that the first magnetic body 84 is not arranged at the center of the leap block 5 but is arranged eccentrically from the center of the leap block 5. Therefore, when the leap block 5 is rotatably supported on the block stand 70 and a second magnetic body 38 (see FIG. 4) that pulls the first magnetic body 84 by magnetic force is located near the leap block 5, the leap block 5 rotates so that the first magnetic body 84 and the second magnetic body 38 approach each other, and thus, the first magnetic body 84 and the second magnetic body 38 are attached.

If necessary, an engagement groove 86 that engages with the leap block mounting unit 30, specifically, with a fixing protrusion 36 of the leap block fixing unit 34 may be formed in one direction at the upper portion of the leap block 5, and the first magnetic body 84 may be formed at one end of the engagement groove 86. In this way, when the engagement groove 86 of the leap block 5 and the fixing protrusion 36 of the leap block fixing unit 34 are fitted and coupled, unintended rotation of the leap block 5 coupled to the leap block fixing unit 34 can be suppressed, and the mounting direction of the leap block 5 can be reliably prevented from being deviated. In addition, a tooth form 5a that meshes with a tooth form 32a formed on the bottom edge of the leap block mounting unit 30 may be formed on the edge of the leap block 5. When the tooth form 32a of the leap block mounting unit 30 and the tooth form 5a of the leap block 5 are meshed and coupled with each other, unintended rotation of the leap block 5 mounted to the leap block mounting unit 30 can be suppressed, and the mounting direction of the leap block 5 can be reliably prevented from being deviated.

The second magnetic body 38 that couples magnetically with the first magnetic body 84 is mounted in one direction on the leap block mounting unit 30, which rotates in the horizontal direction and couples with the leap block 5 in a certain direction. Specifically, the leap block mounting unit 30 may include a leap block mounting unit housing 32, and the leap block fixing unit 34, which is mounted inside the leap block mounting unit housing 32, to the lower end of which the leap block 5 is detachably mounted, and to which the second magnetic body 38 is mounted in one direction. Here, the fact that the second magnetic body 38 is mounted in one direction means that the second magnetic body 38 is not arranged at the center of the leap block fixing unit 34 but is arranged eccentrically from the center of the leap block fixing unit 34. Therefore, when the leap block 5 is rotatably supported on the block stand 70 and the second magnetic body 38 that pulls the first magnetic body 84 by magnetic force is located near the leap block 5, the leap block 5 rotates so that the first magnetic body 84 and the second magnetic body 38 approach each other, and thus, the leap block fixing unit 34 and the leap block 5 are aligned and coupled in the same direction. The first magnetic body 84 and the second magnetic body 38 may be common magnetic bodies that can be coupled by magnetic force, for example, the first magnetic body 84 may be a magnet, and the second magnetic body 38 may be a metal. In addition, the fact that the leap block 5 is detachably mounted to the leap block fixing unit 34 means that the user can move the leap block 5 to a desired position by coupling the upper end of the leap block 5 with the lower end of the leap block fixing unit 34, and when the lower end of the leap block 5 adheres to the blank lens, the leap block 5 is separated from the leap block fixing unit 34, and thus, leap block 5 is maintained in the state of being adhered to the blank lens.

As shown in FIG. 3, in the leap block mounting device in accordance with one embodiment of the present disclosure, the leap block fixing unit 34 may have a structure capable of moving up and down inside the leap block mounting unit housing 32. In this case, with the leap block fixing unit 34 protruding below the leap block mounting unit housing 32, when the leap block mounting unit 30 is moved down to near the leap block 5 rotatably supported on the block stand 70 and the leap block mounting unit 30 is rotated, the second magnetic body 38 of the leap block mounting unit 30 and the first magnetic body 84 of the leap block 5 approach each other, the second magnetic body 38 of the leap block mounting unit 30 and the first magnetic body 84 of the leap block 5 are aligned and coupled with each other with the magnetic force, and thus, the leap block 5 is mounted onto the lower end of the leap block mounting unit 30. The rotation of the leap block mounting unit 30 and the leap block fixing unit 34 linked thereto may be carried out by driving a gear 32b formed in the leap block mounting unit housing 32 with a motor (not shown). Rotating the leap block mounting unit 30 horizontally in this way is commonly referred to as theta axis rotation.

After coupling the leap block 5 and the leap block fixing unit 34 with the magnetic force of the first magnetic body 84 and the second magnetic body 38, the leap block fixing unit 34 is raised to a predetermined height, to cause the tooth form 32a formed on the bottom edge of the leap block mounting unit housing 32 and the tooth form 5a formed on the edge of the leap block 5 to be meshed with each other, thereby fixing the leap block 5 to the leap block mounting unit 30. Thereafter, the leap block mounting unit 30 is moved to a leap block attachment position of the blank lens and lowered, to thereby cause the lower end of the leap block 5 to be attached to the blank lens. In this state, if the leap block fixing unit 34 is raised further, since the tooth form 32a of the leap block mounting unit housing 32 and the tooth form 5b of the leap block 5 are meshed, the leap block 5 can no longer be raised and only the leap block fixing unit 34 is raised, resulting in the leap block 5 and the leap block fixing unit 34 to be separated. In this state, if the leap block mounting unit 30 is raised and returned to the initial position, a blank lens having the leap block 5 attached thereto can be obtained.

Furthermore, in the leap block mounting device in accordance with one embodiment of the present disclosure, an elastic member 76 such as a compression spring is mounted between the leap block fixing unit 34 and the leap block mounting unit housing 32, and pushes the leap block fixing unit 34 downward, i.e., drives the leap block fixing unit 34 downward, to thereby cause the leap block fixing unit 34 to be maintained in the state of protruding below the leap block mounting unit housing 32. In addition, one end of a wire 74 moving upward is connected to one end of the leap block fixing unit 34, and pulls the leap block fixing unit 34 upward, i.e., drives the leap block fixing unit 34 upward, to thereby cause the leap block 5 to be fixed to the tooth form 32a of the leap block mounting unit housing 32 or cause the leap block fixing unit 34 to be separated from the leap block 5. The other end of the wire 74 is mounted on a pulley 82 that is rotated by a motor (not shown) such as a step motor, and as the pulley 82 rotates (counterclockwise in FIG. 3), the wire 74 will be raised. The wire 74 and the pulley 82 may be coupled in a common method.

According to a leap block mounting method in accordance with the present disclosure, first, the leap block 5 is supported so as to be rotatable in the horizontal direction on the block stand 70 fixedly mounted to one end of the blocking device frame 10. Here, the support portion 82 rotatably supported by the block stand 70 is formed in the center of the leap block 5, and the first magnetic body 84 is mounted in one direction. Next, the leap block mounting unit 30 on which the second magnetic body 38 to be coupled with the first magnetic body 84 by magnetic force is mounted in one direction is brought close to the leap block 5, specifically, the blocking arm 40 is used to lower the vertical position (Z-axis position) of the leap block mounting unit 30 to an appropriate position (e.g., a position where the first magnetic body 84 and the second magnetic body 38 can be rotated and coupled with each other) above the leap block 5. Next, the leap block mounting unit 30 is rotated in the horizontal direction (i.e., theta axis rotation), to thereby cause the leap block 5 to be aligned and coupled to the leap block mounting unit 30 in a certain direction. In other words, when the leap block mounting unit 30 is rotated on the theta axis, the leap block mounting unit 30 and the leap block 5 are aligned and adhered to each other by the magnetic force of the first magnetic body 84 and the second magnetic body 38. After that, when the wire 74 is pulled, the leap block 5 is mounted to fit the tooth form 32a of the leap block mounting unit 30.

According to the leap block mounting device in accordance with the present disclosure, once the leap block 5 is placed on the block stand 70 regardless of the direction, i.e., without taking the direction into account, the leap block mounting unit 30 automatically finds the mounting direction of the leap block 5 and causes the leap block 5 to be mounted to the leap block mounting unit 30 in a certain direction. According to the present disclosure, since the leap block 5 is automatically aligned and mounted once the leap block 5 is simply placed on the block stand 70 that the user can intuitively see, it is easy to mount the leap block 5, there is no risk of the leap block 5 being mounted upside down (prevention of user mistakes), and the contact between the leap block 5 and the user is minimized, making it possible to prevent a decrease in the adhesive force of the tape attached to the bottom of the leap block 5.

Although the present disclosure has been described above with reference to specific embodiments, the present disclosure is not limited to the specific embodiments described above and various modifications are possible within the scope set forth in the following claims.

What is claimed is:

1. A leap block mounting device comprising:
   a block stand fixedly mounted to one end of a blocking device frame and configured to support a leap block so that the leap block is rotatable in a horizontal direction;
   the leap block in which a support rotatably supported by the block stand is formed in the center, and a first magnetic body is mounted in one direction; and
   a leap block mounting unit to which a second magnetic body that couples with the first magnetic body by magnetic force is mounted in one direction, and which rotates in the horizontal direction and couples with the leap block in a fixed direction,
   wherein an engagement groove that engages with a fixing protrusion of the leap block mounting unit is formed in one direction at an upper portion of the leap block, and the first magnetic body is formed at one end of the engagement groove.

2. The leap block mounting device of claim 1, wherein the block stand comprises:
   a cylindrical stand body having one end fixed to the blocking device frame and configured to support the leap block; and
   a block fixing portion fixed to the other end of the stand body, having one end rotatably supporting the leap block, and having a cylindrical shape having a smaller diameter than the block stand body.

3. The leap block mounting device of claim 1, wherein the leap block mounting unit comprises a leap block mounting unit housing, and a leap block fixing unit, which is mounted inside the leap block mounting unit housing, to a lower end of which the leap block is detachably mounted, and to which the second magnetic body is mounted in one direction.

4. The leap block mounting device of claim 3, wherein the leap block fixing unit is movable up and down inside the leap block mounting unit housing, and after coupling the leap block and the leap block fixing unit with the magnetic force of the first magnetic body and the second magnetic body, the leap block fixing unit is raised to a predetermined height, to cause a tooth form formed at a bottom edge of the leap block mounting unit housing and a tooth form formed at an edge of the leap block to be meshed with each other, thereby fixing the leap block to the leap block mounting unit, and after attaching the leap block to a blank lens, the leap block fixing unit is raised further, to thereby cause the leap block and the leap block fixing unit to be separated from each other.

5. The leap block mounting device of claim 3, wherein an elastic member is mounted between the leap block fixing unit and the leap block mounting unit housing, and pushes the leap block fixing unit downward, to thereby cause the leap block fixing unit to be maintained in a state of protruding below the leap block mounting unit housing, and one end of a wire moving upward is connected to one end of the leap block fixing unit, and pulls the leap block fixing unit upward, to thereby cause the leap block to be fixed to a tooth form of the leap block mounting unit housing or cause the leap block fixing unit to be separated from the leap block.

6. A leap block mounting method comprising the steps of:
   supporting a leap block so as to be rotatable in the horizontal direction on a block stand fixedly mounted to one end of a blocking device frame, wherein a support rotatably supported by the block stand is formed in the center of the leap block, and a first magnetic body is mounted in one direction; and
   causing the leap block to be aligned and coupled to a leap block mounting unit in a fixed direction, by bringing the leap block mounting unit on which a second magnetic body to be coupled with the first magnetic body by magnetic force is mounted in one direction close to the leap block and rotating the leap block mounting unit in the horizontal direction,
   wherein an engagement groove that engages with a fixing protrusion of the leap block mounting unit is formed in one direction at an upper portion of the leap block, and the first magnetic body is formed at one end of the engagement groove.

* * * * *